United States Patent

[11] 3,571,490

[72] Inventors Steve Bunish;
Ting H. Ling, Marion; William A. Beasley, Fairmont, Ind.
[21] Appl. No. 3,406
[22] Filed Jan. 16, 1970
[45] Patented Mar. 16, 1971
[73] Assignee Anaconda Wire and Cable Company

[54] FLAME RESISTANT ELECTRIC CABLE
9 Claims, 1 Drawing Fig.

[52] U.S. Cl................................................. 174/113,
174/110, 174/120, 174/121
[51] Int. Cl.................................................. H01b 7/02
[50] Field of Search........................................... 174/113,
110, 110.3, 110.4, 120, 120.3, 120.4, 121, 121.3, 121.4, 107

[56] References Cited
UNITED STATES PATENTS

| | | | |
|---|---|---|---|
| 3,110,623 | 11/1963 | Feild ............................. | 174/110PM |
| 3,149,199 | 9/1964 | Pedretti et al. ................ | 174/113 |
| 3,191,005 | 6/1965 | Cox................................ | 174/120UX |
| 3,304,214 | 2/1967 | Alm................................ | 174/110X |
| 3,206,542 | 9/1965 | Dawson et al. ................ | 174/120 |

OTHER REFERENCES
R. B. Blodgett, R. G. Fisher, A new Corona-And Heat-Resistant Cable Insulation Based on Ethylene Propylene Rubber, IEEE Trans on Power, Dec. 1963 p. 980—988

*Primary Examiner*—Lewis H. Myers
*Assistant Examiner*—A. T. Grimley
*Attorney*—Volk, Victor F.

ABSTRACT: A cable that will withstand a severe flaming burlap test is constructed without any metal barrier or heavy asbestos layer using ethylene-propylene insulation, polychloroprene jackets and sheath and two film-supported asbestos tapes only 6 mils thick.

Patented March 16, 1971
3,571,490
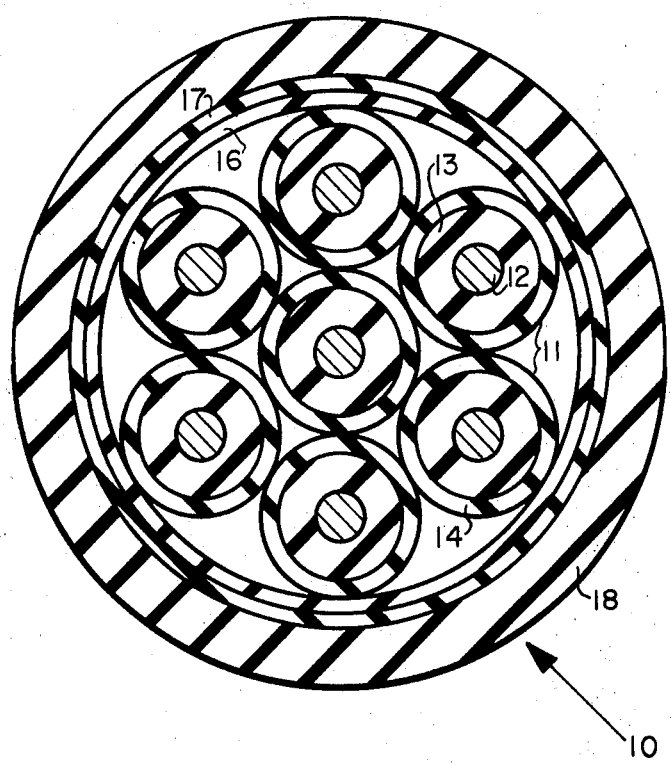
INVENTORS
STEVE BUNISH
TING H. LING
BY W. A. BEASLEY
*V. F. Voell*
THEIR AGENT

FLAME RESISTANT ELECTRIC CABLE

BACKGROUND OF THE INVENTION

Power and control cables for electric generating stations and industrial plants are commonly laid in open conduits or trays, rather than closed conduit pipes or ducts so that they will be easily accessible and well ventilated. In such open installations they may, however, be exposed to fires of external origin, and, since the integrity of the cables may be vital to the operation of the generating station or industrial plant and the safety of many persons, a severe flame propagation test that we shall call the burning burlap flame test, has been established to evaluate the suitability of cables for critical applications. This test is conducted as follows:

Burning Burlap Flame Test

A vertical metal cable tray 6 inches wide and 8 feet high is erected to be free from drafts. A continuous cable is hung in a plurality of loops in a single layer from top to bottom of the tray, leaving one-half a cable diameter between loops. The conductors within the cable are connected to a 3-wire 120/240 volt circuit with the center conductor connected to neutral and with opposite polarities connected alternately to the other conductors. Lamps are connected to indicate conductor shorting.

A 24 by 24 inch square of 7 ½ounce commercial burlap is crumpled, immersed in transformer oil for 1 minute, drained for 10 seconds and inserted into the tray about 12 inches above the lower cable ends with the burlap held in place with a loose metal band. The burlap is ignited and allowed to burn until it is consumed. The cable fails if a self-sustaining, propagating fire results or if a short occurs.

Prior efforts to make flame resistant cables have involved the use of silicone insulation which is expensive and has relatively poor electrical properties, heavy wrappings of asbestos which adds to the bulk and hygroscopicity of the cable, and metal tapes and conduits which we have found, unexpectedly, to be inferior to the cable structure of our invention, hereinbelow described.

SUMMARY

We have invented an electric cable, capable of passing the burlap flame test hereinabove described, comprising a plurality of insulated conductors each comprising a copper strand and a layer of electrical insulation of either ethylene-propylene copolymer, ethylene-propylene-(diene monomer) terpolymer or blends thereof surrounding the strand. The insulation layer is covered with a jacket of polychloroprene or chlorosulfonated polyethylene and the plurality of conductors are wrapped overall with a barrier layer comprising a polymeric-film-supported asbestos tape preferably no thicker than 10 mils. A sheath of polychloroprene or chlorosulfonated polyethylene surrounds the barrier layer which, in a preferred embodiment, consists of two 6 mil film-supported asbestos tapes.

By means of our novel cable we propose not only to meet the burlap flame test but to do so with a relatively small diameter cable having high electrical properties and moisture resistance.

BRIEF DESCRIPTION OF THE DRAWING

The drawing shows a section of a cable of our invention.

DETAILED DESCRIPTION OF PREFERRED EMBODIMENTS

In the FIG. a cable 10 shown in section has been constructed by cabling together seven insulated conductors 11 in a known manner. Although a seven-conductor cable has been illustrated our invention is by no means limited to this number and we have made cables from two to 19 conductors within the scope of our invention the novel featurers of which are applicable to even larger cables. The conductors may be laid parallel instead of being cabled, particularly in the case of those having two and three conductors, within the scope of our invention. Each of the insulated conductors 11 has a metal strand 12 serving as electrical conductor, this strand may comprise a single wire or, for greater flexibility, it may comprise a plurality of wires, such as copper wires, twisted together in a known manner.

Surrounding each of the strands 12 we have provided a layer of polymeric electrical insulation 13 formed of a vulcanized copolymer or terpolymer of ethylene and propylene. Because these polymers are not themselves flame retardant they have not, to our knowledge, been previously used in a flame-retardant cable, but we have found, surprisingly, that although, as has been described the burning burlap flame test will fail if the cable continues to sustain or propagate flame the cable herein described can pass this test and still have the advantages afforded by the good electrical properties and high moisture impermeability of the ethylene-propylene terpolymers. These polymers are commercially available and have ASTM (American Society for Testing Materials) designations EPM for the ethylene-propylene copolymer and EPDM for the ethylene-propylene-(diene monomer) terpolymer. An EPDM suitable for use in our invention is available from E.I. du Pont de Nemours & Co., Inc. wherein the dien monomer comprises 1—4 hexadiene. These copolymers and terpolymers when properly vulcanized as by a peroxide such as dicumyl peroxide, are characterized by high softening points and it may be hypothesized that this property contributes to the ability to resist shorting of our cables during the flame test.

An individual jacket 14 is provided for each of the insulated conductors 11 in our cable 10. These jackets are extruded directly over the insulation 13 from a stock of polychloroprene (neoprene) or chlorosulfonated polyethylene. The latter is available commercially under the trademark Hypalon from E.I. du Pont de Nemours & Co. Both of these jacket stocks require vulcanization and are characterized as thermosetting rather than thermoplastic.

Around the assembled conductors 11 there are helically wrapped two very thin barrier tapes 16, 17 of film-backed asbestos. Each of these tapes is only 6 mils thick so that their presence adds very little to the bulk and weight of the cable. A suitable product for use as the tapes 16, 17 is sold by Chase & Sons, Inc. as Chase Product 0L—647, a laminate of slightly saturated asbestos paper and polyester film reinforced with longitudinal glass yarns. The overall thickness of the laminate is 6 mils and the weight is only 21 pounds per 100 square yards, yet cables made to our invention with only the tapes 16, 17 as flame barriers survived the burning burlap flame test while cables with heavier glass tapes and cables, with copper tapes in addition, failed. The small gauge of our tapes 16, 17 appears to be a contributing factor in the survival of our cable 10 in that it permits the release of decomposition gases generated within the cable when it is severely overheated. A polychloroprene or chlorosulfonated polyethylene sheath 18 is extruded over the tapes 16, 17 and forms the outer protective covering of the cable. Where longitudinal fillers are required for roundness, such as for rounding out cables having only three or four conductors a neoprene filler of known type is preferably laid in the interstices between the insulated conductors 11.

We have invented a new and useful cable of which the foregoing description has been exemplary rather than definitive and for which we desire an award of Letters Patent as defined in the following claims:

We claim:

1. An electric cable capable of passing the burning burlap flame test herein described comprising:
   A. a plurality of insulated conductors, each comprising:
      a. a metal strand;
      b. a layer of electrical insulation selected from the group consisting of ethylene-propylene copolymer and ethylene-propylene-(diene monomer) terpolymer surrounding said strand; and c. a jacket selected from the group consisting of polychloroprene and chlorosulfonated polyethylene surrounding said layer;

B. a helically applied heat barrier comprising a polymeric-film-supported asbestos tape surrounding said plurality of conductors overall; and C. a sheath surrounding said barrier selected from the group consisting of polychloroprene and chlorosulfonated polyethylene, said cable being free from metallic barrier layers.

2. The cable of claim 1 wherein said jackets comprise polychloroprene.

3. The cable of claim 1 wherein said jackets comprise chlorosulfonated polyethylene.

4. The cable of claim 1 wherein said sheath comprises polychloroprene.

5. The cable of claim 1 wherein said sheath comprises chlorosulfonated polyethylene.

6. The cable of claim 1 wherein said layer comprises ethylene-propylene copolymer.

7. The cable of claim 1 wherein said layer comprises ethylene-propylene-(diene monomer) terpolymer.

8. The cable of claim 1 wherein said heat barrier tape is no thicker than 10 mils.

9. The cable of claim 1 wherein said heat barrier consists of two 6 mil film-supported asbestos tapes.